United States Patent [19]

Ito

[11] Patent Number: 5,264,774
[45] Date of Patent: Nov. 23, 1993

[54] MOTOR CONTROL CIRCUIT AND MOTOR DRIVE SYSTEM USING THE SAME

[75] Inventor: Fumihiko Ito, Kyoto, Japan

[73] Assignee: Rohm Co., Ltd., Kyoto, Japan

[21] Appl. No.: 916,275

[22] Filed: Jul. 21, 1992

[30] Foreign Application Priority Data

Jul. 23, 1991 [JP] Japan .................. 3-206301
Jul. 23, 1991 [JP] Japan .................. 3-206302

[51] Int. Cl.⁵ .............................................. H02P 7/00
[52] U.S. Cl. .................................. 318/798; 318/808
[58] Field of Search ........ 318/254, 138, 439, 498–812, 318/632, 652, 653

[56] References Cited

U.S. PATENT DOCUMENTS

| | | | |
|---|---|---|---|
| 3,707,638 | 12/1972 | Nailen | 318/138 X |
| 4,385,265 | 5/1983 | Uzuka | 318/138 |
| 4,412,159 | 10/1983 | Uzuka | 318/254 |
| 4,435,673 | 3/1984 | Hagino et al. | 318/138 X |
| 4,491,770 | 1/1985 | Gotou | 318/254 |
| 4,562,386 | 12/1985 | Goff et al. | 38/254 |
| 4,608,524 | 8/1986 | Yokobori | 318/254 |
| 4,987,352 | 1/1991 | Ishii | 318/254 |

*Primary Examiner*—Jonathan Wysocki
*Attorney, Agent, or Firm*—Fay, Sharpe, Beall, Fagan, Minnich & McKee

[57] ABSTRACT

A motor control circuit and a motor drive system using the same, in which a first transistor between the collector-emitter of which a first current in response to a drive signal for driving a motor is flown and a second transistor the base of which is connected to the base of the first transistor and between the collector-emitter of which a second current in response to the first current is flown are included, and the second current or a current dependent upon the second current is outputted to the coil of the motor as a motor drive current and the second transistor is turned to the saturation condition when the voltage at the coil rises more than a predetermined value, comprising a detection circuit of the saturation condition which is connected to the base of the second transistor and generates a detection signal in response to a voltage variation of the base of the second transistor when the second transistor operates under the saturation condition; and a feed-back circuit which decreases the second current by decreasing the first current flowing through the first transistor in response to the detection signal.

25 Claims, 4 Drawing Sheets

WAVEFORM EXAMPLE OF Pa

FIG.5

WAVEFORM EXAMPLE OF Pa

FIG. 4

MOTOR CONTROL CIRCUIT AND MOTOR DRIVE SYSTEM USING THE SAME

BACKGROUND OF THE INVENTION

1. Field of the Invention

The present invention relates to a motor control circuit and a motor drive system using the same and more specifically relates to a motor control circuit and a motor drive system using the same which are used for a video tape recorder, a flexible disk drive device (FDD), a hard disk drive device (HDD) and a magneto-optical disk drive device in which noise caused by switching operation of a transistor in a final output stage thereof are prevented.

2. Description of Related Art

Figure 4:
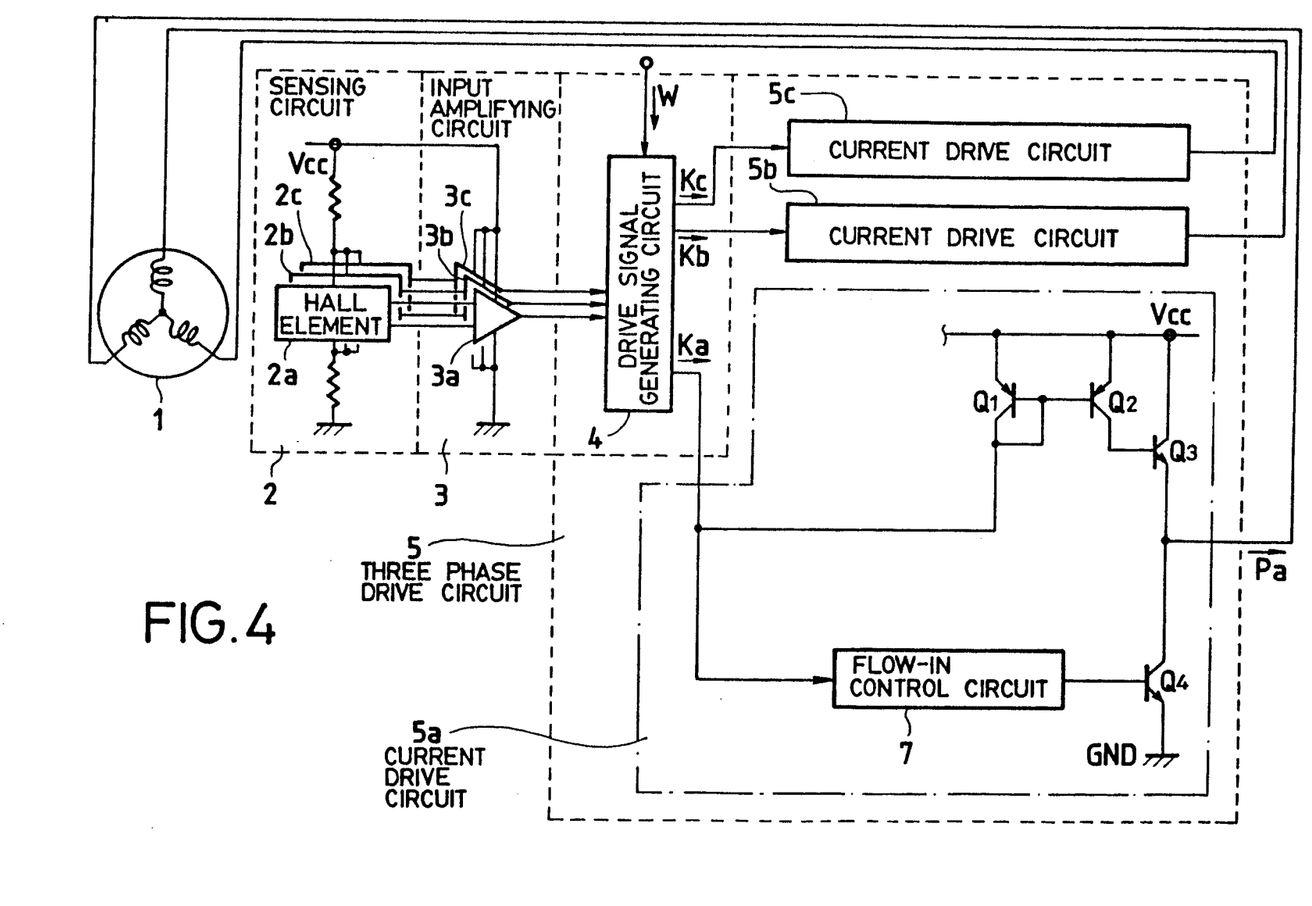
FIG. 4 is an explanatory view of a conventional three phase motor control circuit.

FIG. 4 is a conventional control circuit diagram of this kind for a three phase motor.

The motor control circuit comprises a motor 1, a sensing circuit 2, an input amplifying circuit 3, a drive signal producing circuit 4 and a three phase motor drive circuit 5 (hereinafter called a drive circuit 5).

The motor 1 comprises three coils to which drive currents having phase differences by about 120° from each other flow to rotate the motor 1.

The sensing circuit 2 is constituted by three Hall elements 2a, 2b, 2c as its major components, senses the rotating phase of the motor 1 and outputs phase detection signals in a form of a voltage signal (a current signal is also applicable) having a sinusoidal waveform or the like. The respective Hall elements are always kept in their operative conditions by the current flowing from the power source line Vcc to the ground line GND via resistors.

The input amplifying circuit 3 is constituted by three differential amplifiers 3a, 3b and 3c as its major components, amplifies the detection signals from the sensing circuit 2 and sends out the same to the drive signal producing circuit 4.

The drive signal producing circuit 4 receives the three amplified signals from the respective differential amplifiers and produces, based upon the received signals, three drive signals Ka, Kb and Kc of which phases deviate by about 120° from each other and, for example, are advanced by 30° with respect to the respective detection signal. These produced drive signals are outputted to the drive circuit 5.

The drive signal producing circuit 4 is supplied with a rotating speed setting signal W for setting the rotating speed of the motor 1 from the outside and produces the drive signals Ka, Kb and Kc of which amplitudes are varied in response to the condition of the signal W so that the motor rotates at a target rotating speed commanded by the signal W. The operating speed setting signal W is normally produced as an analogue signal via a servo circuit (not shown) upon receipt of a signal representing the rotating speed or the rotating condition of the motor 1. However, the servo circuit may produce the rotating speed setting signal W upon receipt of the output from one of the Hall elements.

The drive circuit 5 is constituted by three current drive circuits 5a, 5b and 5c. The respective current drive circuits receive one of the respective drive signals, amplify the same and send out respective drive currents to one of the respective assigned coils of the motor 1. Namely, the current drive circuit 5a sends out a drive current having a current waveform according to the drive signal Ka to the assigned coil, the current drive circuit 5b sends out a drive current having a current waveform according to the drive signal Kb to the assigned coil and the current drive circuit 5c sends out a drive current having a current waveform according to the drive signal Kc to the assigned coil.

In the motor control circuits of this kind, the motor 1, the sensing circuit 2, the input amplifying circuit 3, the drive signal producing circuit 4 and the drive circuit 5 constitute a feed-back loop. Namely, in response to the rotating condition of the motor 1 the sensing circuit 2 generates detection signals dependent upon the rotating phase of the motor 1, and the three phase motor 1 is driven in a three phase full wave by driving signals having phases advancing by e.g. 30° with respect to the respective detection signals and having waveforms corresponding to the respective detection signals, and the resultant drive is detected by the sensing circuit 2 in the form of the detection signals corresponding to the rotating conditions. Thereby, under a steady state condition, the motor 1 is rotated at a constant rotating speed determined by the rotating speed setting signal W in response to the drive signals from the drive signal producing circuit 4.

Now, the drive circuit 5 is explained hereinafter, since the three current drive circuits have the same constitutions, the current drive circuit 5a is explained in detail and the explanation of the other current drive circuits 5b and 5c is omitted.

The current drive circuit 5a receives the drive signal Ka and produces a drive current Pa having a waveform according to the drive signal. Here the drive signal Ka is assumed to be in a form of a voltage signal, and both cases when the voltage value is positive and negative are explained. When the value of the drive signal Ka is negative, the drive signal Ka is current-amplified by a flown-in control circuit 7 and an output stage transistor Q4 connected thereto, and the drive current Pa flows-in from the coil of the motor 1 to sink the same to the ground terminal GND.

When the value of the drive signal Ka is positive, an output stage, which is constituted by a PNP transistor Q1 in diode connection receiving the drive signal Ka, a PNP transistor Q2 constituting a current mirror circuit together with the transistor Q1 and a NPN transistor Q3 in Darlington connecion to the transistor Q2, current-amplifies the drive signal Ka and the drive current Pa is supplied to the coil of the motor 1 from the power source line Vcc.

However, in the conventional motor control circuits of this kind, the voltage induced in the coil may increase as high as the voltage of the power source line Vcc when the drive current Pa is supplied depending upon the value of the target rotating speed set by the rotating speed setting signal W and load conditions. For this reason, the collector-emitter voltage of the transistor Q3 in the final output stage decreases too low, in other words, the emitter voltage of the transistor Q3 increases too high to maintain the operating voltage between the base and emitter thereof. Thereby, the transistor Q3 may temporarily cut off or the operating point thereof may shift toward the cut-off side.

Figure 5:
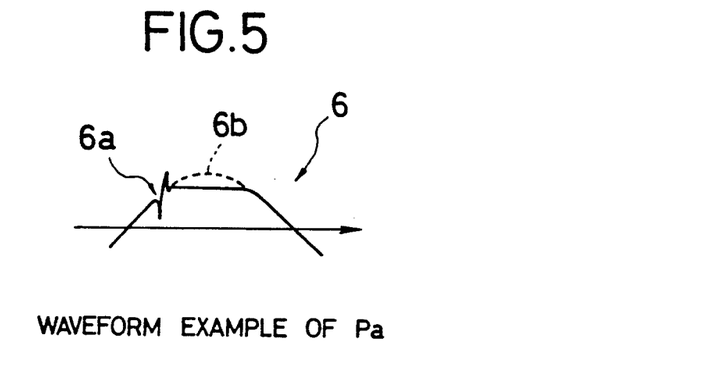
FIG. 5 is an explanatory view of a drive current waveform in the circuit shown in FIG. 4.

The above behavior is explained with reference to an exemplary waveform 6 of the drive current Pa as shown in FIG. 5. Since the drive capacity of the transistor Q3 is limited, the crest of the waveform of the drive current Pa in the above case is disturbed with respect to an ideal waveform 6b of the drive current Pa. Further, at the deviating point from the ideal waveform 6b of the drive current Pa where the crest disturbance begins the transistor Q3 is cut-off, thereby a large disturbance portion 6a is generated. The transistor Q3 in the output stage performs the switching operation in this large disturbance portion 6a. When the output stage transistor Q3 performs such undesired switching operation, extreme noises are generated in addition to the result of useless power consumption.

SUMMARY OF THE INVENTION

The motor control circuit and the motor drive system using the same, according to the present invention, have a first transistor collector-emitter first current responsive to a drive signal for driving a motor and a second transistor with a base connected to the base of the first transistor and between the the second transistor collector-emitter second current responsive to the first current, and the second current or a current dependent upon the second current is outputted to the coil of the motor as a motor drive current. The second transistor is turned to a saturation condition when the voltage at the coil rises more than a predetermined value. A detection circuit of the saturation condition is connected to the base of the second transistor and generates a detection signal in response to a voltage variation of the base of the second transistor when the second transistor operates under the saturation condition, and a feed-back circuit decreases the second current by decreasing the first current flowing through the first transistor in response to the detection signal.

The motor control circuit according to the present invention operates in an active state as in there is sufficient remaining conventional circuit when the drive capacity of the second transistor which supplies the drive current to the motor. As a result no detection signal is generated. However, when the drive capacity thereof reaches its limit and the second transistor enters into the saturation condition, the detection signal is generated and the feed-back circuit is activated, and the first current flowing through the first transistor decreases. Thereby, the second current flowing through the second transistor drops and the second transistor is driven away from the saturation condition.

When the second transistor operates to enter into a saturation condition, the feed-back is activated as explained above and the second transistor operates immediately before the saturation condition. As a result, the second transistor does not enter into the cut-off condition, accordingly, no disturbance portion 6a indicated in FIG. 5 is generated.

Further, when the detection circuit has a third transistor (a transistor for detection) in a current mirror connection with the first transistor and the feed-back circuit is constituted by a differential amplifying circuit and when drive capacity there is remaining, a current having a waveform according to the first current (flowing out from the first transistor) flows out from the collector of the transistor for detection. Thereby, when the collector of the first transistor is driven by the first current corresponding to the drive signal, the detection signal from the transistor for detection coincides with the drive signal. When the differential amplifying circuit is designed to perform calculation upon receipt of these signals and produces an error signal, because of the coincidence of the drive signal and the detection signal, the value of the error signal is rendered "0" and by subtracting this value from the current through the collector coresponding to the drive signal, a correction drive signal which controls the drive current (the second current) of the second transistor is obtained. The correction drive signal which is obtained when the error signal is "0" and flows through the collector of the first transistor is equal to the first current corresponding to the drive signal.

The above condition is functionally equivalent to having neither the third transistor nor the differential amplifying circuit. Namely, the first transistor (which corresponds to Q1 in the exemplified conventional circuit) receives the current drive signal (first current) corresponding to the drive signal, the second transistor (which corresponds to Q2 in the exemplified conventional circuit) produces an inverted current (the second current) according to the signal and the transistor in the final output stage (which corresponds to Q3 in the exemplified conventional circuit) controls the drive current flowing from the power source line to the output terminal. As will be understood from the above, when there is drive capacity, the circuit of the present invention functions substantially the same as the conventional circuit.

However, when the drive capacity reaches to its limit, the voltage applied to the load extremely increases and approaches to the power source voltage to run short of the collector-emitter voltage of the transistor in the final output stage.

When the collector-emitter voltage of the transistor in the final output stage decreases at saturation, the collector-emitter voltage of the second transistor in Darlington connection with the final output stage transistor also decreases, therefore the operating point of the second transistor enters into a saturation condition and begins to move in the cut-off direction. Accordingly, the transistor for detection which commonly shares the base with the second transistor produces a detection signal different from the drive signal depending upon the degree of influence from the second transistor.

Herein, the differential amplifying circuit outputs an error signal depending upon the difference (at this instance not "0") between the detection signal and the drive signal and feeds-back the same to the drive current for driving the collector of the first transistor. Accordingly, the first transistor operates depending upon the correction drive signal which is obtained by subtracting the error signal (the component affected by the load) from the drive signal, an over drive which exceeds the drive capacity of the later stage transistor (the final output stage transistor) is eliminated.

As a result, even when the drive capacity reaches its limit, the cut-off of the final output stage transistor is avoided during the time when the drive current is sent out and the generation of the undesirable noise is prevented.

Further, the transistor Q2 which is adapted to drive the final output stage transistor in the output stage can be eliminated. The collector of the final output stage transistor may be connected directly to the output terminal of the drive current. However, the drive current is generally large in comparison with the other current carrying signals, so that a drive stage transistor for driving the final output stage transistor is included, and further, such constitution shows more advantageous effects according to the present invention, because the drive stage transistor generates larger noise.

Accordingly, an object of the present invention is to provide a motor control circuit in which the output stage transistor never cuts off even when the drive capacity thereof reaches its limit.

Another object of the present invention is to provide a motor control circuit in which generation of noise due switching of the output stage transistor which outputs a drive current to the motor is prevented.

A further object of the present invention is to provide a motor drive system in which generation of noise due switching of the output stage transistor which outputs a drive current to the motor is prevented.

DESCRIPTION OF THE PREFERRED EMBODIMENTS

Figure 1:
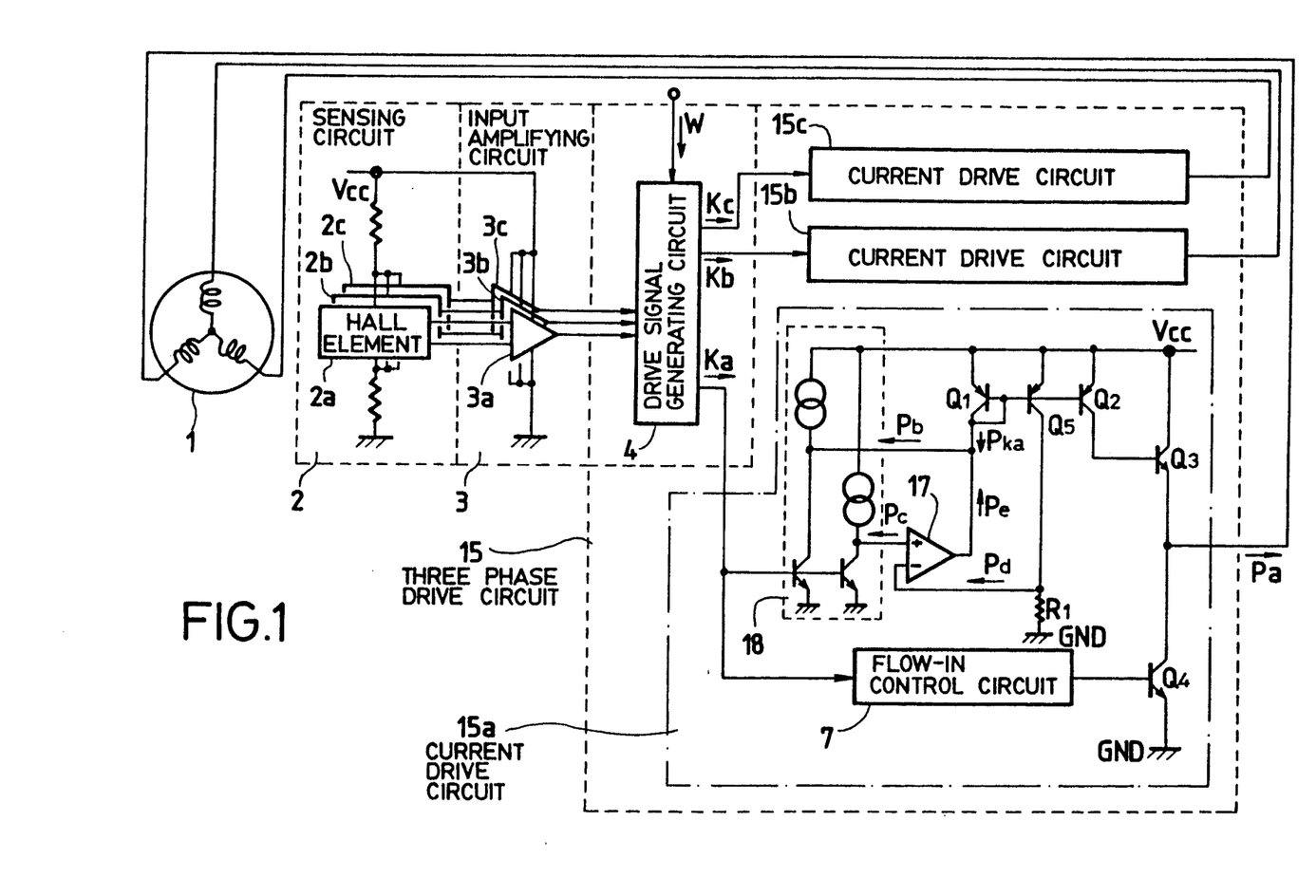
FIG. 1 is an explanatory view of a three phase motor control circuit, showing one embodiment of motor control circuits according to the present invention.

The three phase motor control circuit as shown in FIG. 1 is provided with a drive circuit 15 in place of the drive circuit 5 in the exemplified conventional circuit as shown in FIG. 4. The other constitution thereof is substantially the same as that shown in FIG. 4. Further, the respective current drive circuits 15a, 15b and 15c constituting the drive circuit 15 are the same, therefore only the current drive circuit 15a is explained and the explanation of the other current drive circuits 15b and 15c is omitted.

The current drive circuit 15a includes, like the conventional example, a transistor Q1 in a diode connection, a transistor Q2 in a current mirror connection with the transistor Q1 and a transistor Q3 in Darlington connection with the transistor Q2. As far as these transistors are concerned, the constitution thereof is the same as that shown in FIG. 4. To the circuit are added a detection transistor Q5 for detecting a saturation condition and a feed-back circuit constituted by a differential amplifying circuit 17 and a resistor R1. Further, a drive signal generating circuit 18 for voltage-current conversion (hereinafter called V-I conversion) is added. Thereby a part of the drive signal from the transistors Q2 and Q3 in the output stage is fed-back to the drive signal Ka in the input side.

When explaining the above constitution more specifically, the emitter of the detection transistor Q5 is connected to the power source line Vcc, the base thereof is commonly shared with the base of the transistor Q2 and constitutes a current mirror circuit with the transistor Q1 and the collector thereof is connected to the ground line GND via a resistor R1.

The drive signal generating circuit 18 is a V-I conversion circuit, receives the voltage drive signal Ka from the drive signal producing circuit 4 and converts the same into two current signals having the same waveform as the drive signal Ka to produce the drive signals Pb and Pc.

The differential amplifying circuit 17 receives the drive signal Pc after it is converted into a voltage signal via a resistor (not shown) as a non-inverted input and receives a detection signal Pd (a voltage signal) from the collector of the transistor Q5 as an inverted input. Thereafter the difference of these signals is amplified and outputted as an error signal (a current signal) Pe. Subsequently, through the wire connection of the output of the differential amplifying circuit 17 with the output side of the current drive signal Pb in the drive signal generating circuit 18 the current drive signal Pb and the error signal Pe are combined and the combined current signal is inputted to the collector of the transistor Q1. Namely, a correction drive signal PKa (a current signal) which is obtained by subtracting the error signal Pe from the drive signal Pb is received at the collector of the transistor Q1. Further, the non-inverted input of the differential amplifying circuit 17 may receive the voltage drive signal Ka directly in place of the drive signal Pc, and in this instance the circuit for generating the current drive signal Pc is eliminated.

In the circuit thus constituted, the base of the detection transistor Q5 is connected in common with the base of the transistor Q1. In this relationship under a normal operating condition the detection transistor Q5 is driven in common with the transistor Q2 in the output stage. As a result, the detection signal Pd provides a current corresponding to the current for driving the motor 1. However, since the base thereof is connected in common with the transistor Q2 in the output stage, when the base voltage of the transistor Q2 is raised by the voltage level of the drive signal applied to the base (the voltage generated at the base via driving of the transistor Q1), the base voltages of the transistors Q1 and Q2 are raised thereby. When the transistors Q2 and Q3 operate to move into their cut-off condition due to the influence from the output side, the base voltage of the transistor Q2 raises higher than the voltage level of the drive signal, thereby the affected current flows as the detection signal Pd.

The above operation is explained more specifically. Under a steady state condition, the base-emitter voltages of the transistors Q5 and Q2 are determined according to the base-emitter voltage of the transistor Q1. Thereby, the current between the emitter and the collector of these transistors is controlled. As a result, a current having the same waveform as that of the drive current Pb flows through the transistor Q5 from the power source line Vcc to the ground line GND via the resistor R1. On the other hand, when the transistors Q2 and Q3 are operated in such a manner to enter into the cut-off condition, the collector-emitter voltage of the transistor Q3 decreases immediately before entering into such condition and the operation of the transistor enters into a saturation condition. At this moment, the base current of the transistor Q3 decreases to substantially zero and the base voltage thereof rises in response to the rise of the voltage at the output side. As a result, the operation of the transistor Q2 also enters into its saturation region. When the transistor Q2 begins to operate in its saturation region, the base-emitter voltage thereof decreases and the potential of the base approaches the voltage of the power source line Vcc. Thereby, the voltages of the transistors Q1 and Q5 are controlled by the base-emitter voltage of the transistor Q2, and a corresponding current flows therethrough as the detection signal Pd. Accordingly, the detection signal Pd represents the saturation condition of the output stage transistor Q3. The detection signal Pd is converted from a current value to a voltage value via the resistor R1 and inputted to the differential amplifying circuit 17.

The differential amplifying circuit 17 receives the drive signal Pc for comparing with the detection signal Pd, however, the drive signal Pc is exclusively used in this circuit so that no influence is received from other signals. Accordingly, the voltage signal based upon the drive signal Pc correctly follows the drive signal Ka, therefore the voltage signal can be used as a reference signal for comparison. When the detection signal Pd is compared with the reference voltage signal, since the detection signal Pd corresponds to the drive signal under a normal operating condition, a feed-back is activated if there is any difference therebetween. Under a steady state condition, the circuit operates in a condition of no difference therebetween. Therefore the error signal Pe is "0". On the other hand, when the transistor Q2 operates in such a manner to enter into the cut-off condition, an error signal Pe is generated when the detection signal Pd is compared with the reference voltage signal.

Another drive signal Pb generates a correction drive signal PKa in combination with the error signal Pe. Since signals Pb and Pe are in a current form when connected in common to the collector of the transistor Q1, currents corresponding to the respective signal values independently flow through transistor Q1, thereby a calculation is performed therein to produce the correction drive signal PKa.

Namely, since detection the signal Pd is fed-back via the detection transistor Q5 to the differential amplifying circuit 17, the drive signal Pb is corrected by the error signal Pe. Therefore, when the transistor Q2 is operated in such a manner to enter into the cut-off condition, the drive signal Pb is further corrected by the error signal Pe in response thereto and the drive current via the transistor Q1 decreases. As a result, the base-emitter voltage of the transistor Q1 follows the base-emitter voltage of the transistor Q2. Thereby, application of such drive current that will cut-off the transistors Q2 and Q3 in the output stage is prevented.

Figure 3:
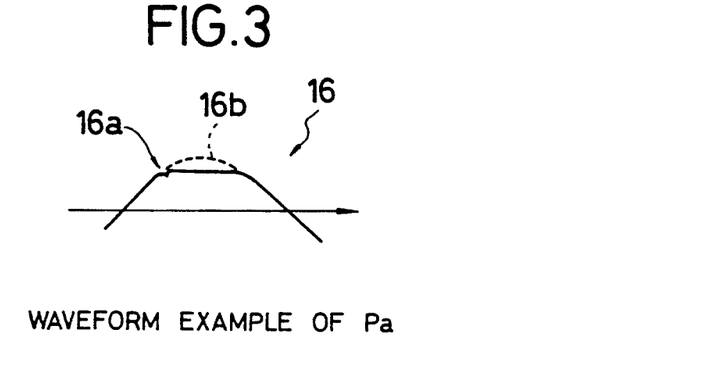
FIG. 3 is an explanatory view of a drive current waveform in the circuit shown in FIG. 2.

As will be understood from the above explanation, when the drive capacity reaches its limit, the voltage applied the load increases very high and approaches to the power source voltage and the collector-emitter voltage of the final output stage transistor Q3 decreases. When the transistor Q3 operates under a saturation condition immediately before entering into the cut-off condition, the influence thereof is transmitted to the base of the transistor Q2, thereby, the base voltage of the transistor Q2 rises. The transistor Q5 detects such condition and such is fed-back as explained above to generate a drive signal which prevents further driving of the transistors Q2 and Q3 in the output stage into the cut-off condition. As a result, even when the drive capacity reaches its limit, the transistors are never driven further. Thereby, the transistors Q2 and Q3 in the output stage never cut-off during the time when a drive current is sent out. As seen from the waveform 16 of the drive current Pa during the above operation as shown in FIG. 3, the disturbance portion 16a of the drive current Pa is substantially eliminated as compared to disturbance portion Pa of FIG. 5, which disturbance portion would be generated when the drive current Pa deviates from that having an ideal waveform 16b.

Figure 2:
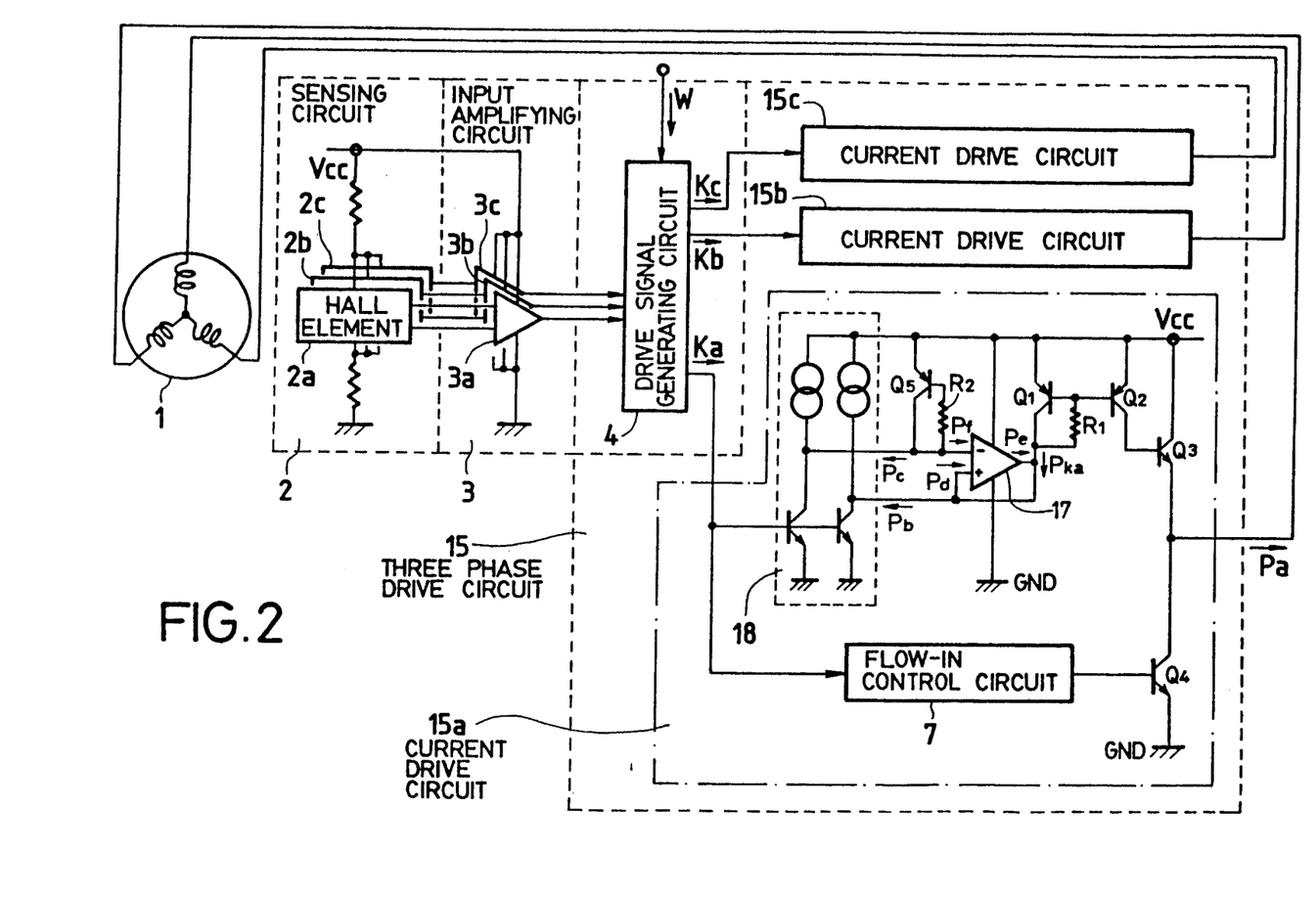
FIG. 2 is an explanatory view of another three phase motor control circuit, showing another embodiment of motor control circuits according to the present invention.

FIG. 2 shows another embodiment of the present invention. Differences of the present embodiment from that shown in FIG. 1 are that the detection transistor Q5 and the detection resistor R1 for detecting the saturation condition are separated. Further, the relationship between the differential amplifying circuit 17 and the above circuits differs and still further a bias resistor R2 is added to the base of the transistor Q5.

The detection resistor R1 is connected between the base and collector of the transistor Q1. On the other hand, the transistor Q5 serves as a circuit for generating a reference signal for comparing with the drive signal generated from the detection resistor R1. The emitter of the circuit is connected to the power source line Vcc, the base thereof connected is to the collector thereof via the resistor R2 and the collector is adapted to receive the drive signal (current value) Pc. As a result, the circuit is the same as the circuit constituted by the transistor Q1 and the detection resistor R1. However, the transistor Q5 circuit differs from the the transistor Q1 circuit on the point that the base of transistor Q5 is not connected to the load side but connected to the input of the differential amplifying circuit 17. Further, different from the transistor Q1 circuit, the transistor Q5 circuit generates the drive voltage driven by the current value of the drive signal Pc. Because of such constitution, the voltage induced at the collector of the transistor Q5 is determined to constitute a drive voltage signal of no load or a fixed load (hereinafter called no load drive voltage signal Pf) in view of the voltage induced at the collector of the transistor Q1. The base of the transistor Q1 is connected to the load so that the transistor Q1 circuit is affected by the load, however the transistor Q5 circuit is not affected by the load and the drive signal Pc is obtained by converting the drive voltage signal Ka, and further the input impedance of the differential amplifying circuit 17 is high.

The differential amplifying circuit 17 receives the no load drive voltage signal Pf at the non-inverted input and receives at the inverted input an actual load drive voltage signal Pd from the juncture between the collector of the transistor Q1 and the detection resistor R1. As will be understood from the explanation on FIG. 1, the detection resistor R1 is connected to the bases of the transistors Q1 and Q2. For this reason the drive signal is affected by the load. The differential amplifying circuit 17 amplifies the difference of the these signals and outputs an error signal (current value) Pe.

The current drive signal Pb and the error signal Pe are combined by the wire connection and the correction drive signal (current value) PKa which is obtained by subtracting the error signal Pe from the drive signal Pb is applied to the juncture of the collector of the transistor Q1 and the detection use resistor R1. Since the differential amplifying circuit 17 is driven by a voltage, the voltage at the collector of the transistor Q1 to which the resistor R1 is connected serves as a drive voltage so that the differential amplifying circuit 17 is not affected by the current drive signal Pb.

In such constitution, the actual load drive signal Pd which is affected by the load is a voltage signal, and the error signal Pe which is used for producing the correction drive signal Ka is a current signal, therefore, even with the non-inverted input terminal of the differential amplifying circuit 17 directly connected in a physical sense to the output terminal, the voltage signal and the current signal are separated, accordingly these signals operate the circuits independently.

The drive signal Pc is used only for producing the no load drive voltage signal Pf and is not affected by other signals, therefore the voltage thereof correctly follows the drive signal Ka. Accordingly, the no load drive voltage signal Pf can be used as a comparing reference signal.

The other drive signal Pb is for producing the correction drive signal PKa in combination with the error signal Pe, and since these signals are in a current form, the currents corresponding to the respective signal values independently flow simply by connecting the lines. Accordingly, as explained previously, through the line connection the calculation is performed to produce the correction drive signal PKa.

The differential amplifying circuit 17, which has received the no load drive voltage signal Pf and the actual load drive voltage signal Pd, outputs an error signal of "0" when there is remaining drive capacity of the control circuit for the motor 1 and, when there is any influence from the load, calculates an error signal having an amplitude corresponding to the degree of the influence and outputs the same. Since when there is remaining drive capacity, the error signal is "0", the correction drive signal which is obtained by subtracting the error signal of "0" from the drive signal is equal to the original drive signal.

On the other hand, when the drive capacity reaches its limit, the voltage applied to the load increases very high and approaches the power source voltage, the collector-emitter voltage of the final output stage transistor Q3 decreases and such influence is transmitted to the transistor Q2 to raise the base voltage of the transistor Q2 which is detected at the detection resistor R1. The detection signal is transmitted to the non inverted input of the differential amplifying circuit 17 and then such is fed-back as explained previously, thereby the drive signal Pb is corrected and the drive current is decreased.

As a result, like the circuit in FIG. 1 even when the drive capacity reaches to its limit the transistor Q3 in the output stage never cuts off during the time when a drive current is supplied. Such condition is respresented by the waveform 16 of the drive current Pa in FIG. 3 which has been explained in connection with FIG. 1.

Further, in the circuits as shown in FIGS. 1 and 2 for the purpose of clarifying the operation of the transistor Q5, resistors and capacitors around the differential amplifiers constituting the differential amplifying circuit 17 are omitted and only the resistor R1 is illustrated.

Further, in the present embodiment, in order that the drive signal Pc which is inputted to the differential amplifying circuit 17 as the comparing reference is not affected undesirably by the connection of the error signal Pe, the drive signal generating circuit 18 is provided and the two drive signals Pb and Pc are produced from the drive signal Ka. However, such constitution is an example for clarifying the operation of the circuit 15a. When either drive signals Pb or Pc can be replaced with a corresponding signal in the drive signal producing circuit, the drive signal generating circuit 18 is eliminated.

Still further, the power source for the current drive circuits 15a, 15b and 15c may be a bias point voltage different from that for the other signal processing circuits.

As explained above, according to the present invention such condition is quickly detected when the drive capacity of the final output stage transistor reaches its limit and the transistor is likely to cut off, and such condition is fed-back to control the transistor so as not to be maintained in the condition where the drive capacity thereof has reached its limit. Therefore the drive current disturbance hardly occurs even when the drive capacity thereof reaches its limit. As a result, the switching of the final output stage transistor, which causes noise, is suppressed to thereby realize a motor control circuit with little noise generation and a motor drive system using the same with little noise generation.

In the present embodiments, the emitters of the transistors Q1, Q2 and Q5 are connected to the common power source line Vcc, however the emitter of the transistor Q1 and the emitters of transistors Q2 and Q5 may be connected respectively to different bias voltage points.

Further, in the present embodiments, the transistor circuit with a PNP transistor and a NPN transistor in Darlington connection is exemplified, however the output stage need not be constituted by the transistors in Darlington connection but may be simply constituted by a transistor in one stage. Any circuits are acceptable in which when a transistor in the output stage is likely to operate under the saturation condition and such condition is transmitted to the base of a transistor receiving the drive signal.

Still further, in case that the power source is determined as a negative power source and the ground side is a positive side, the same operation can be obtained with a motor control circuit having a NPN transistor in place of the PNP transistor and a PNP transistor in place of the NPN transistor.

While a preferred embodiment has been set forth with specific details, further embodiments, modifications and variations are contemplated according to the broader aspects of the present invention, all as determined by the spirit and scope of the following claims.

I claim:
1. A motor system, comprising:
   a three phase motor having three driving coils;
   a sensing circuit for separately sensing the position of each of said coils and correspondingly producing three sensing signals;
   a drive signal generating circuit responsive to the three sensing signals for correspondingly producing three drive signals;
   three current drive circuits respectively responsive to the three drive signals for producing three output coil driving currents respectively for said three driving coils;
   wherein said drive signal generating circuit and the current drive circuits will increase the coil driving currents in response to increasing load on said motor;
   wherein each of said current drive circuits is separate from and substantially identical to the other current drive circuits, and includes a transistor output stage having an emitter-collector path passing the coil driving current and reducing emitter-collector voltage in response to increasing coil driving current to decrease a transistor base voltage of the output stage at saturation of the output stage to where the transistor base voltage of the output stage is less than the base operating voltage of the output stage to cut off the output stage, a detection circuit having a detection transistor with a base commonly connected with said output stage base to produce a detection signal representative of a saturation condition of the output stage at the time when the output stage current drive capacity reaches a predetermined limit, and a control circuit responsive to the detection signal for controlling the transistor base voltage of the output stage so that the output stage collector-emitter path is not driven further than its current drive capacity limit.

2. The system of claim 1, wherein said output stage includes a drive transistor including the collector-emitter path and a drive base, and an input transistor having a substantially smaller current capacity than said drive transistor in Darlington connection with said drive transistor and having said transistor base of said output stage, to prevent cut off of said drive transistor and thereby prevent noise that would be produced by cut off of said drive transistor.

3. The system of claim 1, wherein said detection circuit provides an error current signal, and the control circuit combines the error current signal with a current corresponding to the drive signal to produce a correction current controlling the voltage of the transistor base of the output stage base voltage.

4. The system of claim 3, wherein said control circuit includes a further transistor in diode connection and having its base commonly connected with the transistor base of said output stage in current mirror connection with said detection transistor, and said further transistor combining the error signal with the current correlated to the drive signal to produce the correction signal applied to said transistor base of said output stage.

5. The system of claim 4, wherein said detection circuits includes a differential amplifier having two inputs respectively connected to receive the detection signal and a signal correlated to the drive signal to output an error signal.

6. The system of claim 5, wherein said drive signal generating circuit generates the drive signals as voltage drive signals, and each of said current drive circuits includes a drive signal generating circuit for converting the voltage drive signal into a current and feeding a current drive signal to said differential amplifier and to said further transistor.

7. The system of claim 1, further including a flow-in control circuit responsive to said drive signal for producing a base control signal, and further including a control transistor having its base receiving the base control signal and a collector-emitter path in parallel with the corresponding motor coil.

8. The system of claim 7, wherein said output stage includes a drive transistor including the collector-emitter path and a drive base, and an input transistor having a substantially smaller current capacity than said drive transistor in Darlington connection with said drive transistor and having said transistor base of said output stage, to prevent cut off of said drive transistor and thereby prevent noise that would be produced by cut off of said drive transistor.

9. The system of claim 8, wherein said detection circuit provides an error current signal, and the control circuit combines the error current signal with a current corresponding to the drive signal to produce a correction current controlling the voltage of the transistor base of the output stage base voltage.

10. The system of claim 9, wherein said control circuit includes a further transistor in diode connection and having its base commonly connected with the transistor base of said output stage in current mirror connection with said detection transistor, and said further transistor combining the error signal with the current correlated to the drive signal to produce the correction signal applied to said transistor base of said output stage.

11. The system of claim 10, wherein said detection circuit includes a differential amplifier having two inputs respectively connected to receive the detection signal and a signal correlated to the drive signal to output an error signal.

12. The system of claim 11, wherein said drive signal generating circuit generates the drive signals as voltage drive signals, and each of said current drive circuits includes a drive signal generating circuit for converting the voltage drive signal into a current and feeding a current drive signal to said differential amplifier and to said further transistor.

13. A motor control circuit, comprising:
a first transistor having collector-emitter first current flowing in response to a drive signal for driving a motor;
a second transistor having a base connected to the base of the first transistor and collector-emitter second current flowing in response to the first current so that the second current or a current dependent upon the second current is outputted to a coil of the motor as motor drive current and the second transistor is turned to the saturation condition when the voltage at the coil rises more than a predetermined value;
a detection circuit of the saturation condition connected to the base of the second transistor and generates a detection signal in response to a voltage variation of the base of the second transistor when the second transistor operates under the saturation condition; and
a feed-back circuit which decreases the second current by decreasing the first current flowing through the first transistor in response to the detection signal.

14. A motor control circuit according to claim 13, wherein:
said detection circuit further includes a further transistor which generates the detection signal when said second transistor is operating in an active state;
said feed-back circuit includes an amplifying circuit which receives either the drive signal or a signal dependent thereupon at a first input thereof and the detection signal at a second input thereof and outputs an output signal dependent upon the difference of the signals at the first and second inputs; and
said first transistor is a transistor in a diode connection, receives the output signal and a current signal dependent upon the drive signal, and is driven when a generated current is generated by a difference between the current signal and the output signal.

15. A motor control circuit according to claim 14, wherein the drive signal is a voltage signal:
further comprising a voltage-current conversion circuit which converts the drive signal to the current signal; and
wherein said first transistor receives the current signal and generates the first current, said amplifying circuit is a differential amplifying circuit that generates the output signal as a current signal dependent upon the difference of the signals at the first and second inputs.

16. A motor control circuit according to claim 14, wherein the drive signal is a voltage signal;
further comprising a voltage-current conversion circuit which converts the drive signal into first and second current drive signals;
wherein said first transistor receives the first current drive signal;
wherein said amplifying circuit is a differential amplifying circuit, receives the second current drive signal at the first input and generates the output signal as a current signal dependent upon the difference between the signals at the first and second inputs.

17. A motor control circuit according to claim 14, wherein said further transistor is a transistor in a current mirror connection with said first transistor, and including a resistor passing the detection signal to output a voltage signal.

18. A motor control circuit according to claim 13, wherein said detection circuit includes a resistor disposed between the base and the collector of said first transistor to generate the detection signal at the collector of said first transistor as a voltage signal when said second transistor operates under the saturation condition and to generate a signal dependent upon the drive signal at the collector of said first transistor as a voltage signal when said second transistor is operating under an active state;
said feed-back circuit is a differential amplifying circuit which receives either the drive signal or a signal dependent thereupon at a first input thereof, receives the voltage signal at a second input thereof and outputs a current signal, dependent upon a voltage difference of the signals at the first and second inputs, to the collector of said first transistor; and
said first transistor receives a current signal dependent upon the drive signal and the output from said differential amplifying circuit to be driven by a difference between the current signal and the output from said differential amplifying circuit.

19. A motor control circuit comprising,
a first PNP transistor, the emitter of which is connected to either a power source line or a bias point, the base of which is connected to the collector thereof and the collector of which is adapted to receive a current dependent upon a first voltage signal for driving a motor;
a second PNP transistor, the emitter of which is connected to either the power source line or the bias point, the base of which is connected to the base of the first transistor and the collector of which is connected to an output terminal for outputting a drive current to the motor;
a third PNP transistor, the emitter of which is connected to one of the power source line, the bias point and another bias point, and the base of which is connected to the base of said second transistor; and
a differential amplifying circuit which receives a voltage signal taken out from the collector of said third transistor and the voltage drive signal and outputs a current dependent upon a difference of these signals to the collector of said first transistor.

20. A motor control circuit according to claim 19, wherein said second transistor is constituted by a plurality of transistors in Darlington connection and the collector or the emitter of one transistor among said plurality of transistors is connected to the output terminal.

21. A motor control circuit according to claim 19, further comprising a first resistor connected between said first PNP transistor and collector.

22. A motor drive system including the motor control circuit according to claim 19, further comprising a motor.

23. A motor drive system including the motor control circuit according to claim 21, further comprising a motor.

24. A motor controller for a motor having a drive coil, comprising:
a sensing circuit for sensing a position of the drive coil and producing a sensing signal;
a drive signal generating circuit responsive to the sensing signal for outputting a drive signal having an alternating wave form; and
a current drive circuit responsive to said drive signal and outputting a coil driving current to said drive coil for driving the motor, said current drive circuit including a drive transistor having a collector-emitter path passing the coil driving current, a control circuit responsive to the drive signal for controlling the coil driving current passing through said drive transistor, a detection circuit having a detection transistor with a base connected to the base of said drive transistor independently of the emitter and collector of said drive transistor for detecting the base voltage of the drive transistor and producing a correlated detection signal, an error circuit comparing the detection signal with the drive signal and producing an error signal greater than zero only when the drive transistor base voltage is reduced by increasing coil drive current flowing therethrough to below a predetermined value substantially corresponding to saturation of the drive transistor such that the drive transistor will cut off, and a control circuit responsive to the error signal for reducing the base voltage of said drive transistor.

25. A motor controller according to claim 24, wherein said control circuit has a transistor with a base connected in common with the base of said detection transistor and an emitter-collector connection such that the emitter collector current is a combination of the error signal and a current correlated to the drive signal.

* * * * *